(12) United States Patent
Stanesic et al.

(10) Patent No.: US 8,163,369 B2
(45) Date of Patent: Apr. 24, 2012

(54) VEHICLE FLOOR TRAY

(75) Inventors: John M. Stanesic, Dacula, GA (US); David E. Hardy, Braselton, GA (US)

(73) Assignee: Omix-Ada, Inc., Suwanee, GA (US)

( * ) Notice: Subject to any disclaimer, the term of this patent is extended or adjusted under 35 U.S.C. 154(b) by 879 days.

(21) Appl. No.: 12/202,497

(22) Filed: Sep. 2, 2008

(65) Prior Publication Data
US 2010/0055411 A1    Mar. 4, 2010

(51) Int. Cl.
*B32B 7/00* (2006.01)
*B32B 3/10* (2006.01)
*B32B 3/00* (2006.01)
*B32B 23/02* (2006.01)
*D06N 7/04* (2006.01)
*B62D 25/20* (2006.01)
*B60R 13/01* (2006.01)

(52) U.S. Cl. ........ 428/119; 428/131; 428/141; 428/156; 428/192; 296/97.23; 296/39.1

(58) Field of Classification Search ............... 296/97, 296/23, 230, 39.1, 97.23; 428/138, 141, 428/192, 119, 120, 156, 99, 88, 95, 131
See application file for complete search history.

(56) References Cited

U.S. PATENT DOCUMENTS

| | | | |
|---|---|---|---|
| 5,330,437 A * | 7/1994 | Durman | 604/167.04 |
| 6,817,649 B1 | 11/2004 | Stanesic | |
| 6,953,545 B1 | 10/2005 | Tyler | |
| 7,316,847 B2 * | 1/2008 | MacNeil | 428/515 |
| 7,329,451 B2 | 2/2008 | Putt et al. | |
| 7,401,837 B2 | 7/2008 | MacNeil | |
| 7,444,748 B2 | 11/2008 | MacNeil | |

(Continued)

FOREIGN PATENT DOCUMENTS

JP    01282081 A * 11/1989

(Continued)

OTHER PUBLICATIONS

International Search Report—PCT/US2009/052962.

(Continued)

*Primary Examiner* — Rena Dye
*Assistant Examiner* — James Yager
(74) *Attorney, Agent, or Firm* — Womble Carlyle Sandridge & Rice, LLP

(57) ABSTRACT

A vehicle floor tray has a base, upstanding side walls, a forward panel, and an aft wall that define a basin for confining liquid such as water, mud, and slush. An array of spaced apart chevron-shaped treads project upwardly from the base. The chevron-shaped treads are arranged in adjacent rows and the treads in each row are oriented in a direction opposite from the direction of orientation of the treads in adjacent rows. Further, each row of treads is shifted or staggered with respect to adjacent rows by a distance substantially equal to half the length of a tread plus half the distance between adjacent treads in a row. This configuration forms a convolutedly shaped network contiguous channels within which liquid may collect and spread out. The shape of the channel network and the shapes and orientations of the chevron-shaped treads inhibits the mass flow of liquid to the front, back, or sides of the floor tray during acceleration, deceleration, and up or down hill traverses. This, in turn, inhibits puddeling of liquid during off-road operation of a vehicle and the problems attendant thereto.

20 Claims, 3 Drawing Sheets

U.S. PATENT DOCUMENTS

| | | |
|---|---|---|
| 7,607,713 B2 | 10/2009 | MacNeil |
| 7,686,371 B2 | 3/2010 | MacNeil |
| 7,776,422 B2 * | 8/2010 | Alford ............................ 428/99 |
| 7,891,151 B2 * | 2/2011 | Sano .......................... 52/506.05 |

FOREIGN PATENT DOCUMENTS

| | | |
|---|---|---|
| JP | 07-300041 A | 11/1995 |
| JP | 11-268570 A | 10/1999 |
| JP | 2004-017946 A | 1/2004 |
| JP | 2004-122901 A | 4/2004 |
| JP | 2005-146555 A | 6/2005 |
| JP | 02005146555 * | 6/2005 |

OTHER PUBLICATIONS

Written Opinion—PCT/US2009/052962.
Picture of a Jeep floor mat.
Weather Tech, All-Weather Floor Mats, WeatherTech.com Oct. 5, 2007.
Weather Tech, FloorLiner, WeatherTech.com Oct. 19, 2007.
Weather Tech, Customer Feedback, WeatherTech.com Dec. 11, 2007.

* cited by examiner

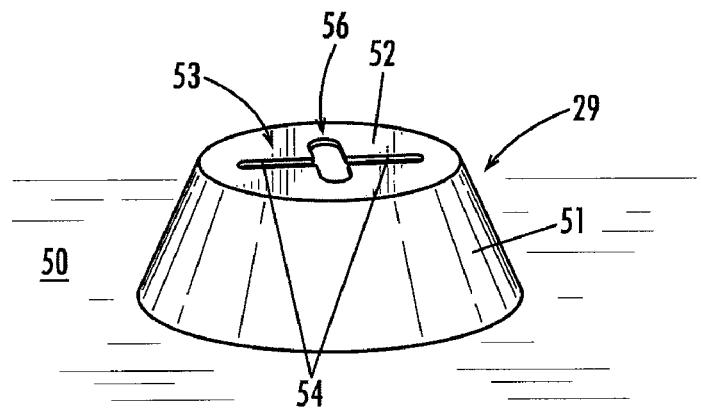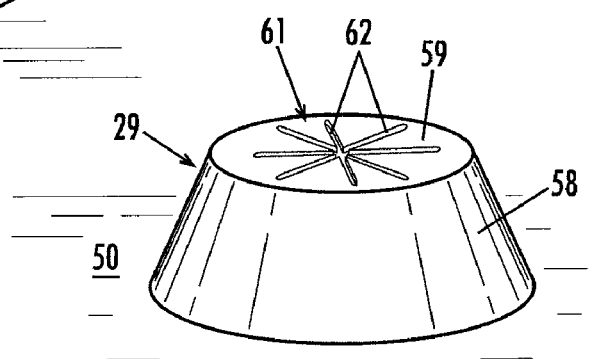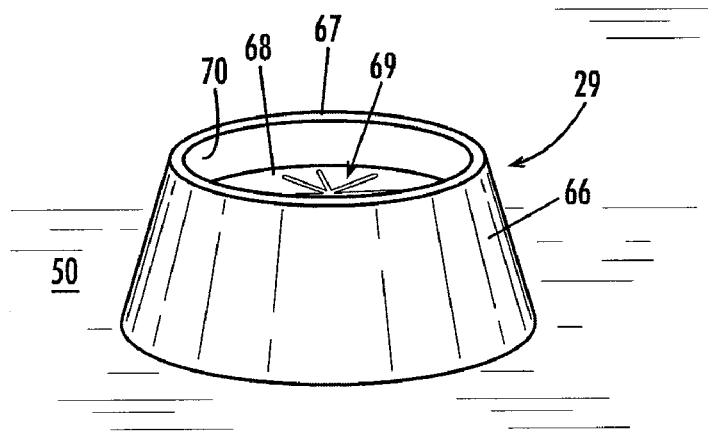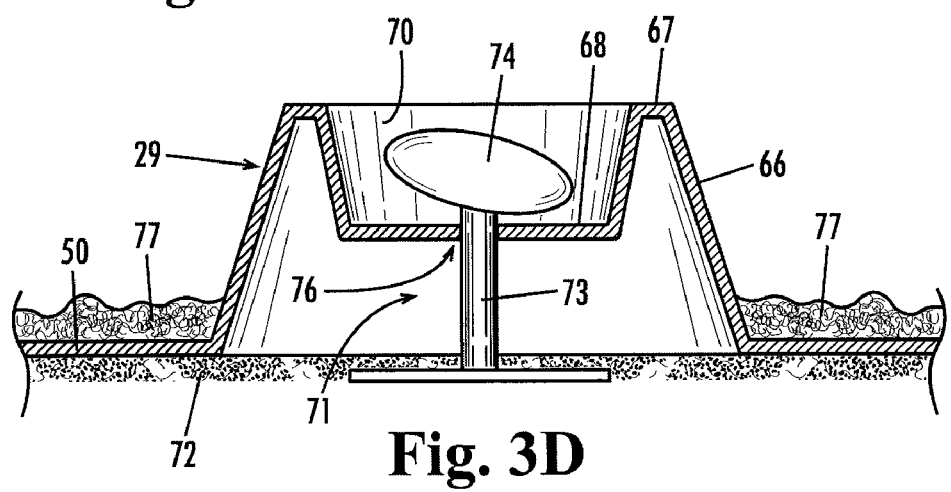

VEHICLE FLOOR TRAY

TECHNICAL FIELD

This disclosure relates generally to floor trays for vehicles and more specifically to floor trays having raised treads that define a network of liquid confining channels.

BACKGROUND

Off-road and general purpose vehicles such as, for instance, pickup trucks, Jeeps®, and SUV's, oftentimes are operated in off-road locations in addition to being driven on paved roads and highways. During off-road activity, it is common for the interior of such a vehicle to become wet, muddy, or soiled as a result of off-road conditions. In particular, the floorboards or floor wells commonly become soiled by occupants placing wet and muddy shoes in the floor wells as a consequence, for example, of having walked across wet, snowy, or muddy ground prior to entering the vehicle. This often results in liquid such as water, mud, and/or slush accumulating on the floor mats and floor trays that commonly are positioned in the floor wells to protect underlying carpet and other surfaces. As the vehicle rapidly accelerates and decelerates, or is driven up or down hills, or is severely jostled during normal and off-road use, the accumulated liquid has a tendency to slosh around within the floor trays in which it has collected, which can cause irritating problems. For instance, when the liquid sloshes to the forward end of a driver's or passenger's floor tray during a stop or a down hill traverse, it can form a relatively deep puddle, which can re-soil shoes, create slippery conditions, or even overflow the edges of the floor tray to soil the protected surface beneath.

One attempt to address the above and other problems has been the so-called deep tread or deep rib floor tray. Deep rib floor trays generally are molded with raised treads on their upper surface that are substantially taller than the treads of traditional floor mats. These treads, then, form between them a series of channels that also are substantially deeper than channels of traditional floor mats. The idea is that water, mud, and slush that might accumulate on the floor tray will collect in the deep channels and, even through it may slosh around, hopefully it will not form puddles deeper than the channels themselves and therefore will not re-soil shoes or overflow the tray. While previous deep rib floor mats have been somewhat successful, water, mud, and slush nevertheless still can overflow the channels as it sloshes to one side of the tray or another to soil shoes and, indeed, can even overflow the trays themselves. In fact, some prior art floor trays have treads that define channels all extending primarily in a single direction, which actually can promote flow and sloshing of liquid in that direction. A need exists for a floor tray that successfully contains and controls the movement of water, mud, and slush that may collect in the floor tray.

It also is common, particularly in modern vehicles, that floor trays and floor mats are held in place in the floor well by one or more anchor hooks that project upwardly from the floor well to extend through corresponding eyelets or other openings formed in the floor mats. While this can be successful at securing the floor mats in place, it obviously also creates an opening in the floor mat. For vehicles, such as automobiles, that are not used in off-road conditions, this opening does not generally present a problem because the floor mats of such vehicles generally are not subjected to collected water, mud, and slush. However, for off-road vehicles such as Jeeps®, water, mud, and slush can leak through the eyelets or openings and onto the carpet or other protected surface beneath. Obviously, this severely compromises the very purpose of the floor tray to protect the often carpeted surface of the floor well from being soiled or ruined. Eliminating the openings is not generally an option because the floor tray will then simply lie atop the upstanding anchor hooks forming a bump in the tray and, without the benefit of the hooks, may not remain in place within the floor well. A need thus exists for a deep rib floor tray that accommodates and makes use of anchor hooks without the risk of liquid leaking through to the protected floor will below.

Prior deep rib floor mats also can exhibit a problem related to the fact that the channels between the upstanding ribs are in fact substantially deeper than normal. More specifically, some drivers have noted that during normal operation of the accelerator, brake, and clutch pedals, the heel of the shoe can become temporarily lodged within a channel between ribs. Not only can this be a nuisance, it also can represent a safety issue, particularly during off-road driving where rapid switching between and manipulation of pedals is common. There also exists a need, therefore, for a deep rib floor tray that minimizes or eliminates the tendency for a driver's shoe to become lodged between the ribs of the tray.

SUMMARY

Briefly described, a deep rib type vehicle floor tray has an overall profile that substantially conforms to the shape a foot well of the vehicle. The floor tray, which may be fabricated of molded rubberized or plastic material, is shaped to define a base and first and second side walls integral with the base and extending upwardly therefrom. A forward panel and an aft wall are integral with the base and also extend upwardly. For the driver and front passenger floor wells, the forward panel may be angled and sized to rest atop the angled forward wall of the floor well. This configuration forms a basin capable of containing water, mud, and slush.

An array of relatively tall generally V-shaped treads, referred to herein as chevron-shaped treads, extend upwardly from the base of the floor tray and form a network of relatively deep channels therebetween. The chevron-shaped treads are arranged in adjacent, spaced-apart rows with the treads in each individual row being commonly oriented; i.e. the apexes of their chevron shapes all point generally in the same direction. Further, the treads of each row are oriented oppositely from the treads of adjacent rows in that the apexes of the chevron-shaped treads of one row point generally in the opposite direction as the apexes of the treads in adjacent rows. Also, each row of chevron-shaped treads is shifted or staggered by a distance approximately equal to half of a tread length plus has of the distance of treads in a row. This unique array of chevron-shaped treads defines between the treads a network of relatively deep channels for the collection and confinement of water, mud, and slush.

Because of the shape, orientation, and/or the staggered configuration of the chevron-shaped treads, the network of channels, although contiguous to allow liquid to spread evenly throughout the network, is made up of a large number of relatively small, somewhat discrete, and generally discontinuous sections. As a result, the free flow of liquid from one end of the channel network to the other is severely inhibited with the desirable consequence that water, mud, and slush does not tend to slosh readily to the front, back, and sides of the tray during acceleration, deceleration, up and down hill traverses, and the starts and stops commonly encountered in off-road driving. It also has been discovered that the unique configuration of treads and channels on the base of the floor tray greatly reduces any tendency for a driver's heels to lodge or get stuck in a channel while operating the pedals of the vehicle.

One or more retention openings are formed in the base of the floor tray for receiving the upstanding anchor hooks found in the floor wells of modern vehicles. To prevent leakage at the locations of these eyes, each opening is formed with an upstanding dam that surrounds and interior land, which may be sunken or recessed, through which the anchor hook extends. The land is formed with a slit pattern configured to deform to allow the head of the anchor hook to move through the slit and, subsequently, to return toward its originally shape to form a seal or at least a partial seal around the shaft of the anchor hook. As a result of the surrounding dam and of the self-sealing feature of the eye, leakage in the vicinity of the opening is significantly reduced or virtually eliminated allowing the floor tray to be secured with anchor hooks without consequent leakage.

The forgoing and other features and advantages will be better understood and appreciated upon review of the detailed description set forth below taken in conjunction with the accompanying drawing figures, which are briefly described as follows.

BRIEF DESCRIPTION OF THE DRAWINGS

According to common practice, the various features of the drawings discussed below are not necessarily drawn to scale. Dimensions of various features and elements in the drawings may be expanded or reduced to illustrate more clearly the embodiments of the invention.

FIG. 3A is a perspective view of one embodiment of a leak resistant retention opening according to aspects of the invention.

FIG. 3B is a perspective view of an alternate embodiment of a leak resistant retention opening according to aspects of the invention.

FIG. 3C is a perspective view of another alternate embodiment of a leak resistant retention opening according to aspects of the invention.

FIG. 3D is a cross-sectional view of the retention opening of FIG. 3C showing an anchor hook extending through the eye.

DETAILED DESCRIPTION

Figure 1:
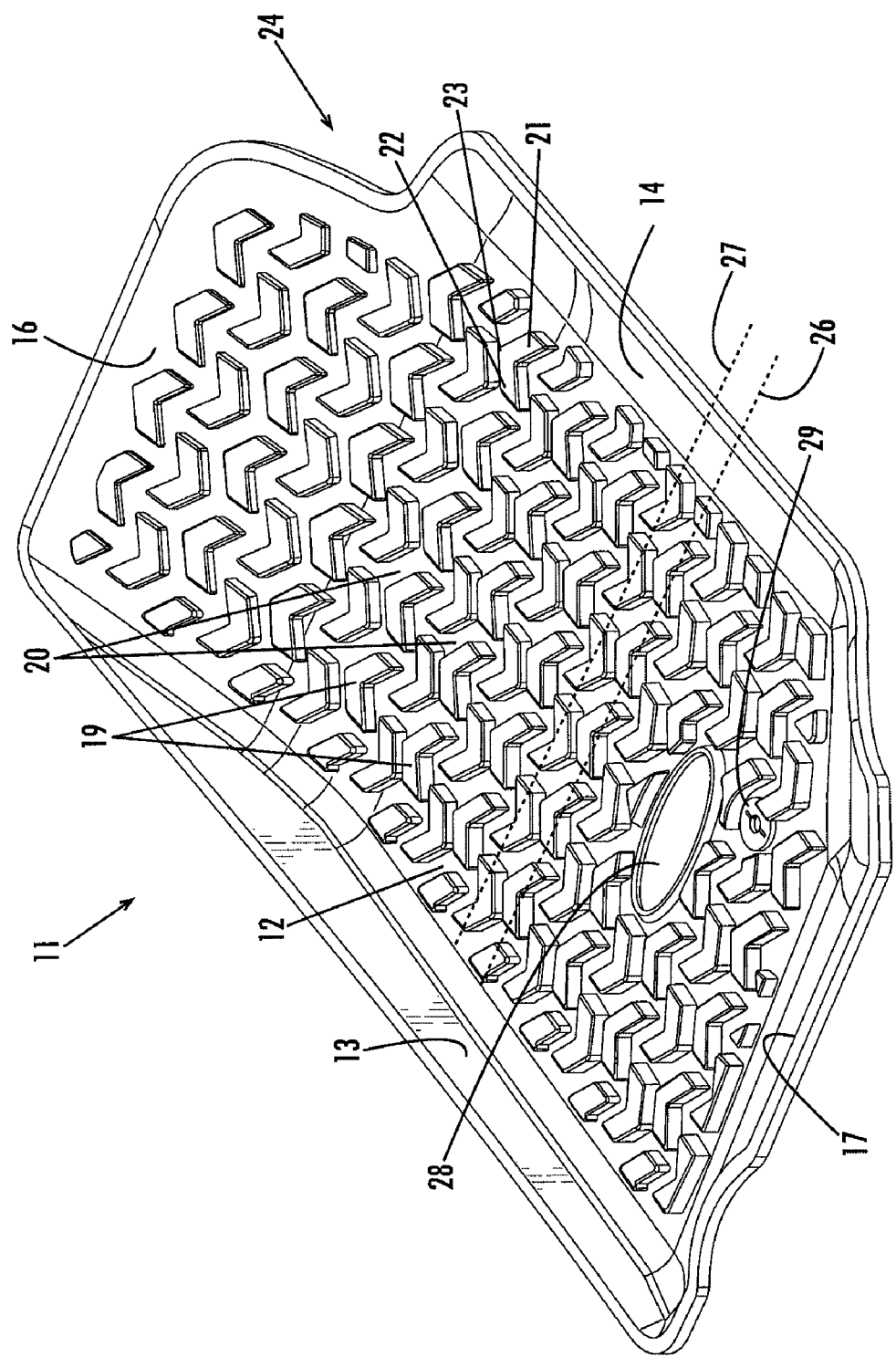
FIG. 1 is a perspective view illustrating a deep rib floor tray for a front compartment, driver's side foot well that embodies principals of the invention in one preferred embodiment.

Referring now in more detail to the drawings, wherein like reference numerals indicate like parts throughout the several views, FIG. 1 illustrates a floor tray that embodies principles of the invention in a preferred form. The floor tray 11 depicted in FIG. 1 is configured to conform to and rest in the front or forward compartment driver side floor well of a Jeep® brand vehicle. It will be understood, however, that the illustrated configuration for this particular type of vehicle is not limiting and that the principles of the invention may be applied to floor trays for any type of vehicle. Further, the floor tray 11 of the preferred embodiment is made of injection molded rubber, rubberized plastic, or polymeric material such as, for example, thermoplastic elastomer (TPE). However, the tray 11 may be formed of any appropriate material useful for the purposes of the invention and may be formed by processes other than injection molding such as, for example, vacuum forming, compression molding, cast liquid molding, or any other appropriate process.

With continued reference to FIG. 1, the floor tray 11 comprises a base 12 size to rest on the floor of the vehicle floor well. A first side wall 13 is integral with the base and extends upwardly therefrom along one side and a second side wall 14 is integral with the base and extends upwardly from the opposite side of the base. A forward panel 16 is integral with the base and side walls and slopes gently upwardly therefrom at the forward edge of the tray 11. The size and angle of the forward panel 16 is predetermined to follow the contour of the forward end portion of the floor well that resides beneath the accelerator, break, and clutch pedals of the vehicle. In this regard, a cutout feature 24 is formed on the right side of the forward panel 16. This cutout feature is shaped to ensure that when the mats are installed in the vehicle, the installation does not interfere with the accelerator panel or get inadvertently positioned over the pedal. Finally, an aft wall 17 is integral with the base 12 and the side walls and extends upwardly therefrom along the rear edge of the floor tray 11. It will be seen that with the described configuration, the floor tray 11 generally forms a basin that both conforms to the shape of the floor well of the vehicle for which it is designed and that is capable of containing liquid such as water, mud or slush to prevent the liquid from soiling the underlying floor well material, which may be carpet.

An array of treads 19 are formed on and project upwardly from the base 12 of the floor tray 11 and, in the embodiment of FIG. 1, extend upwardly onto the forward panel 16 of the tray. Each of the treads 19 preferably is configured in the shape of a chevron, but may be configured in other shapes that achieve the same performance characteristics. That is, each tread 19 is configured with a first leg 21 and a second leg 22 that meet at a predetermined angle and that form an apex 23 of the tread. While the chevron-shaped treads 19 may be formed with a wide variety of sizes, angles, and shapes, it has been found that, for the preferred embodiment, each tread is approximately 1.5 inches from side to side and the angle at which the legs of the chevron meet is approximately 120 degrees. Further, the width of the chevron-shaped treads; that is, the width of each of its legs in the preferred embodiment is approximately 0.5 inches. Finally, on the base 12 of the tray 11, the chevron-shaped treads of the preferred embodiment project upwardly from the floor of the base a distance of approximately 0.3 inches. All of these dimensions may be varied by as much as 100 percent or more within the scope of the invention.

The chevron-shaped treads 19 are arranged in spaced apart rows, two of which are indicated by dashed lines 26 and 27 in FIG. 1. As can be seen in FIG. 1, the chevron-shaped treads 19 in each row (for example Row 26) are oriented in the same direction. That is, the apex of each chevron-shaped tread in a row points in the same direction such as, in the case of Row 26, toward the forward end of the floor tray 11. Further, each tread in a row is spaced from adjacent treads in the row. In the preferred embodiment, the spacings between treads in a row is approximately 0.4 inches; however, a wide variety of larger or smaller spacings may be selected to satisfy application specific performance characteristics. Further, the rows may contain partial treads, particularly on the ends of each row and around the perimeter of the base as seen in FIG. 1.

The chevron-shaped treads in row 27, which is adjacent to row 26, are oriented in a direction opposite to the direction in which the chevron-shaped treads are oriented in row 26. That is, in row 27, the apexes of the treads point in the opposite direction as the apexes of the treads in row 26. In the illustrated embodiment, the apexes of the treads in row 27 are oriented toward the rear or aft end of the floor tray 11. Finally, the chevron-shaped treads in row 27 are shifted or offset along the row by a distance approximately equal to one-half of a tread length plus one half of the spacing between treads of a row so that the apexes of the treads in row 27 are aligned with the spaces between the chevron-shaped treads of row 26. More generally speaking, each row of treads is shifted or offset with respect to the treads in adjacent rows.

The just described configuration of the array of chevron-shaped treads defines between the plurality of treads a convolutedly shaped network of channels 20. The channels of the network are all contiguous in that each channel is communication with each other channel along one or more convolutedly shaped paths. Accordingly, liquid such as water, mud, or slush may collect within the channel network, where it spreads out evenly throughout the extent of the network. The height of the chevron-shaped treads is selected so that, under normal off-road conditions, the depth of the liquid in the channel network is less than the height of the chevron-shaped treads. Thus, the upper surfaces of the treads present a surface on which a driver's or passenger's shoes can rest and the surface is raised above the liquid collected within the tray. In this way, the liquid, which generally is muddy or slushy, does not re-soil the shoes. Furthermore, the upper surfaces of the chevron-shaped treads provide a dry slip resistant surface for the shoes, which is important particularly when engaging in off-road driving activities.

The array of treads and the channel network of the present invention are particularly useful to prevent liquid collected and contained within the tray from sloshing in one direction or the other and thereby forming pools that can overflow the treads of the tray or the tray itself and/or soil the shoes and/or result in a slippery surface that can be troublesome and even dangerous. For example, consider the scenario wherein a shallow pool of liquid such as water or slush is contained within the channel network and the driver suddenly applies the breaks of the vehicle or begins a steep downhill traverse. The momentum of the vehicle, or gravity, will cause the pool of liquid to begin to move forward within the floor tray 11. As the forward movement of the liquid begins, small regions of the forward moving liquid pool behind each of the many forward facing chevron-shaped treads and thus becomes trapped or dammed behind these treads. Furthermore, small regions of liquid behind each of the rear facing treads is directed by the angle sides of the treads to the next adjacent row of treads. Each of these small regions of liquids thus also encounter and are trapped behind the next adjacent forward facing row of treads. As a result, a large number of small liquid pools form behind the forward facing treads where each small pool is prevented from moving further forward on the base of the floor tray 11. As a consequence, the sudden stop of the vehicle does not cause liquid collected within the tray to flow forward to the front end of the floor tray and collect in a pool where it can overflow the tray, overflow the treads, and generally cause an undesirable and perhaps unsafe mess at the forward end of the tray.

A similar phenomenon occurs when for example, the vehicle is rapidly accelerated or travels up hill. In this scenario, the liquid collected within the channel network 20 tends to flow rearwardly toward the aft end of the floor tray 11. However, just as with the previously described scenario, a large number of small pools of liquid are intercepted and dammed behind the rear facing chevron-shaped treads as opposed to a large volume of liquid flowing to the rear or aft end of the floor tray 11. Liquid thus does not pool at the rear end of the floor tray as can be the case with prior art trays.

Side-to-side sloshing of liquid within the channel network 20 also is inhibited by the convolutely shaped paths that the liquid must travel to traverse the mat from one side to the other. It will be understood, however, that front to back and back to front sloshing of liquid within the channel network is a much more common problem than side-to-side sloshing and the configuration of the tread array in FIG. 1 may be more efficient at preventing front to back and back to back sloshing than side-to-side sloshing.

In addition to the array of chevron-shaped treads just described, the floor tray 11 also preferably is provided with a retention opening 29 for receiving an anchor hook that extends or projects upwardly from the floor well of a vehicle. As previously mentioned, such anchor hooks are common in modern vehicles and their purpose is to help hold floor mats and floor trays in place and prevent them from slipping or creeping out of position in the floor well. As described in more detail below, the retention opening 29 of the present invention is designed to prevent liquid collected within the floor tray 11 from seeping or leaking through the retention opening to soil the surface of the floor well beneath. Finally, the floor tray 11 also preferably is formed with a snap-in logo feature 28 sized to receive the logo of a distributor, private label customer, or manufacturer of the floor tray.

It can be seen in FIG. 1 that the height of the chevron-shaped treads becomes gradually less as the treads move up the angled forward panel 16 of the tray. This is because the forward panel 16 is above the level of any liquid that is likely to collect in the bottom of the tray so that sloshing does not become a problem in this region. Furthermore, to the extent that slush or other liquid may drip from a driver's shoes as he operates the pedals of the vehicle, the short height of the treads in the region of the forward panel 16 allows the water to drain more freely downwardly into the region of the base of the tray.

Figure 2:
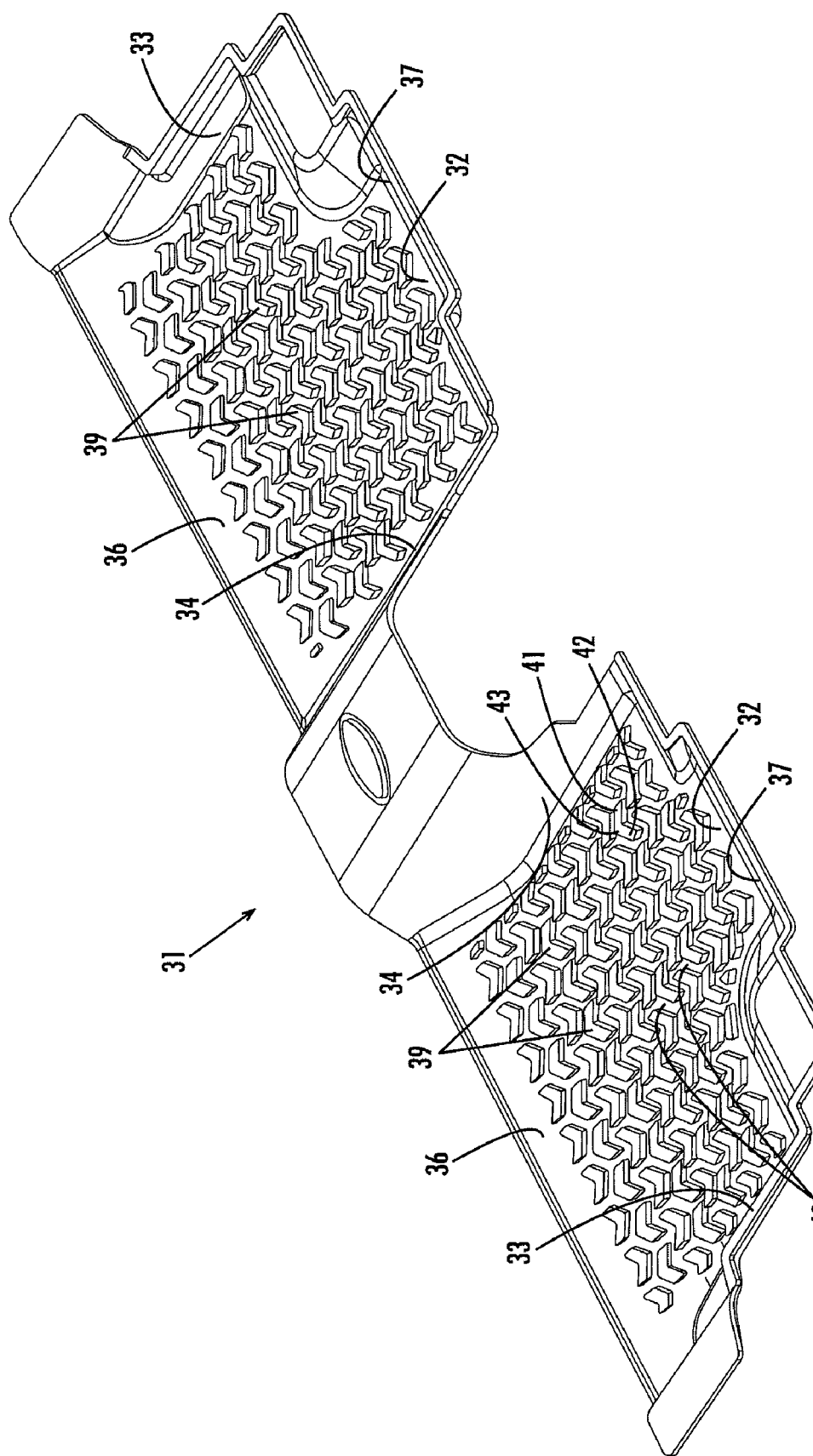
FIG. 2 is a perspective view illustrating a deep rib floor tray for a rear compartment foot well that embodies principles of the invention in one preferred form.

FIG. 2 illustrates the present invention applied to a dual floor tray, which typically may be used in the rear compartment of a vehicle such as a Jeep® brand off-road vehicle. The configurations and principles of the floor tray of FIG. 2 are the same as for FIG. 1 and thus will not be described in great detail here. Generally speaking, however, the rear floor tray 31 is a single piece injection or otherwise molded rubberized plastic unit that incorporates both driver and passenger side trays. As with the forward compartment floor tray of FIG. 1, each of the trays in FIG. 2 has a base 32, a first side wall 33 integral with and projecting upwardly from the base, a second side wall 34 integral with and projecting upwardly from the base opposite side 33, an upwardly angled forward panel 36, and an aft wall 37. The walls, panel, and base form a basin for containing liquid such as water, mud, and slush. Further, the rear floor tray 31 is configured overall to conform and fit snuggly within the floor well of a particular vehicle such as, in the case of FIG. 2, a Jeep® brand off-road vehicle.

Similar to the tray 11 of FIG. 1, the base 32 of each tray in FIG. 2 is provided with any array of chevron-shaped treads that project upwardly from the base and extend at least partially up the forward panel 36. The chevron-shaped treads 39 preferably are configured and arranged the same as the treads in FIG. 1. More particularly, each tread 39 comprises a first leg 41 and a second leg 42 that meet at an angle to define an apex 43. The chevron-shaped treads, as in FIG. 1, are arranged in rows with the treads in each row facing in a direction opposite to the treads in adjacent rows. Adjacent rows also are shifted or offset with respect to each other by a distance approximately equal to half the width of a chevron-shaped tread plus half the distance of the space between treads in a row. The height of the treads above the base 32 can vary, but generally are the same as for the forward compartment tray 11 of FIG. 1.

As in FIG. 1, the array of treads in FIG. 2, as in FIG. 1, form a contiguous but convolutedly shaped channel network 40 within which collected liquid such as water, mud, and slush can collect and spread out. However, rapid acceleration or deceleration or merely traveling down hill or up hill will not result in puddling at the front or rear end of the floor tray because of the configuration and placement of the chevron-shaped treads, as detailed above with respect to FIG. 1. Thus, the same advantages are achieved for the rear compartment of the vehicle as are achieved for the forward compartment.

FIGS. 3A through 3D detail alternate configurations for the retention opening 29 (FIG. 1). As mentioned above, the retention opening is configured to receive the anchor hook that projects upwardly from the floor well of the vehicle to hold the floor tray 11 in place and prevent it from slipping around. In the embodiment depicted in FIG. 3A, the retention opening 29 comprises upstanding tapered outer walls 51 that extend upwardly from the base 50 of a floor tray. A land 52 spans the top of the upstanding side walls 51. An opening 53 is formed in the land to accommodate an anchor hook. More specifically, the opening 53 in this embodiment comprises an elongated slit 54 that is interrupted at its middle portion by a circular central aperture 56. The slit 54 essentially subdivides the land 52 into a pair of flaps that can bend upwardly and deform to allow the head of an anchor hook to be pressed through the retention opening 29. When the head of the anchor pops through the opening 53, the flaps spring back down until the circular opening 56 encircles and substantially seals around the shaft of the anchor hook. In use, the raised side wall 51 of the retention opening forms a dam that prevents liquid collected on the base of the floor tray from flowing beneath the tray through the retention opening. Further, the configuration of the opening 53 forms a relatively water-tight seal that inhibits leakage of liquid trough the retention opening 29 where the anchor hook extends through the eye.

FIG. 3B illustrates an alternate embodiment of an retention opening. In this embodiment, a side wall 58 projects upwardly from the base 50 of a floor tray and is capped by a land 59. The opening 61 is this embodiment is formed by a series of crisscrossed slits 62 that define pie-shaped flaps in the land 29. The head of an anchor hook can be pressed through the land 29, whereupon the pie-shaped flaps bend upwardly to accommodate passage of the head. When the head moves beyond the opening 61, the flaps spring back down to form a reasonably good watertight seal around the shaft of the anchor hook.

FIG. 3C illustrates yet another embodiment a retention opening that embodies principles of this invention. In this embodiment, an outer wall 66 projects upwardly from the base 50 of a floor tray to an annular rim 67. In this embodiment, the land 68 is recessed into the retention opening, forming inner walls 70 of the eye. The land 68 is provided with an opening 69 configured to accommodate passage of the head of an anchor hook as described above. The opening 69 may take on any of a number of configurations that accommodate such passage, including the criss-crossed configuration shown in FIGS. 3B and 3C.

FIG. 3D is a cross-sectional view of the retention opening of FIG. 3C showing how the retention opening cooperates with an anchor hook 71 to help hold the floor tray in place. The anchor hook 71 is seen to have a shaft 73 and ahead 74 and is secured to the floor well and projects upwardly therefrom. When the floor tray is properly positioned within the floor well, the retention opening 29 aligns with the anchor hook. The retention opening can then be pressed downwardly, whereupon the head 74 of the anchor hook passes through the opening within the land 68 of the retention opening. When the head 74 clears the opening, the land 68 springs back to embrace the shaft 73 of the anchor hook to form a relatively good seal around the shaft. Thus, even if water should collect within the recess of the retention opening 29, it is inhibited from leaking through to the underlying floor well by the seal created around the shaft of the anchor hook. Further, liquid 77 that may accumulate on the base 50 of the floor tray is dammed by the upstanding wall 66 of the retention opening and thus prevented from leaking beneath the floor tray.

It will thus be seen that the unique retention opening of the present invention permits full beneficial use of anchor hooks in modern vehicles while simultaneously preventing unwanted leakage of liquid through the retention openings at the location of the anchor hooks.

In addition to the forgoing advantages, it has been discovered that the floor tray of this invention provides a variety of additional advantages over prior art trays. For example, the upper surfaces of the chevron-shaped treads have been found to provide a superior slip resistant surface for the shoes of drivers and passengers. Further, because, it is believed, of the convoluted shape of the channel network defined by the treads of this invention, the tendency of a driver's heel to become lodged or struck in the channels, which can be encountered with prior art deep rib floor mats, is significantly reduced or eliminated. Also, the alignment configuration of the rows facilitates easy cleaning with, for example, a pressure washer wand. Specifically, a soiled floor tray can be hung sideways and sprayed off with a pressure washer wand, whereupon the water flows between the rows of treads to drain readily from the tray facilitating efficient drying. Finally, the configuration of the slits in the lands of the retention openings forms a substantial seal around an anchor hook as described. These configurations also substantially close when no anchor hook is present to form a substantial seal when used with vehicles that do not have anchor hooks. Leakage at the locations of the retention openings is thus inhibited whether or not an anchor hook is present.

The invention has been described herein in terms of preferred embodiments and methodologies considered by the inventor who represent the best mode of carrying out the invention. It will be understood by those skilled in the art, however, that the various additions, deletions, and modifications may well be made to the illustrated embodiments within the scope of the invention. For example, while the individual treads in the preferred embodiment are chevron-shaped, they also may take on other shapes, such as small curved or circular segments, that trap sloshing liquid in a similar manner. In addition, while the treads have been shown facing forward and aft in the preferred embodiments, they may face in different directions such as, for example, side-to-side, corner-to-corner, or otherwise. In addition, sections of treads facing in different directions on the same mat may be employed to inhibit sloshing of water equally in all directions. The floor tray of the present invention may be formed with any configuration sized and shaped to fit virtually any vehicle. A wide variety of materials may be used to fabricate the floor tray including any appropriate type of polymer, rubberized plastic, rubber or otherwise. These and other modifications may be made to the embodiments illustrated above without departing from the spirit and scope of the invention as set forth in the claims.

What is claimed is:

1. A floor tray substantially conforming to a foot well of a vehicle, comprising:
    a base having a lower surface for engaging the foot well and an upper surface opposite the lower surface;
    a first side wall integral with the base and extending upward from the base;
    a forward panel integral with the base, adjacent the first side wall, and extending upward from the base;
    a second side wall integral with the base, adjacent the forward panel, arranged opposite the first side wall, and extending upward from the base;
    an aft wall integral with the base and extending upward from the base; and
    an array of treads projecting upwardly from the upper surface of the base and comprising a plurality of alternating and staggered chevron-shaped treads;
    the chevron-shaped treads being arranged in rows with chevron-shaped treads in a first row being oriented in a first direction and chevron-shaped treads in a second row adjacent the first row being oriented in a second direction substantially opposite from the first direction;
    at least some chevron-shaped treads in the second row being shifted by a predetermined distance along the row with respect to chevron-shaped treads in the first row.

2. The floor tray of claim 1, further comprising a weather resistant retention opening projecting upwardly from the upper surface to receive an anchor hook arranged on the foot well.

3. The floor tray of claim 2, wherein a portion of the anchor hook extends through a disruption in a top of the retention opening and secures the floor tray in an installed position in the foot well when the floor tray is disposed in the foot well.

4. The floor tray of claim 1, wherein the forward panel is formed with a cutout for an accelerator pedal.

5. The floor tray of claim 1, wherein the floor tray is a rear compartment floor tray extending from a drivers side to a passenger's side of the automobile.

6. A floor tray as claimed in claim 1 wherein the predetermined distance is substantially equal to one-half of a length of the treads plus one-half of a spacing between treads of a row.

7. A floor tray as claimed in claim 1 wherein the chevron-shaped treads form between them a channel network for containing liquid, the chevron-shaped treads of one row being positioned to direct liquid through the channel network toward the oppositely oriented chevron-shaped treads of an adjacent row when the liquid flows toward the adjacent row so that relatively small portions of the liquid are trapped behind the chevron-shaped treads of the adjacent row to prevent pooling of the liquid on the floor tray.

8. A channeling system for a foot well of a vehicle, comprising:
    a floor tray having a bottom panel and raised side walls and conforming to a foot well of the vehicle, the bottom panel having an upper surface that faces upwardly when the floor tray is disposed in the foot well of the vehicle;
    at least a first row of spaced apart chevron-shaped treads on projecting from the upper surface of the bottom panel, each chevron-shaped tread in the first row being oriented in a first direction;
    at least a second row of spaced apart chevron-shaped treads projecting from the upper surface of the bottom panel adjacent the first row, each chevron-shaped tread of the second row being oriented in a second direction different from the first direction;
    at least some chevron-shaped treads in the second row being shifted along the row by a predetermined distance relative to the chevron-shaped treads in the first row.

9. The channeling system of claim 8, wherein the second direction is opposite the first direction.

10. The channeling system of claim 8, wherein the first row is spaced apart from the second row and a plurality of first and second rows of spaced apart chevron-shaped treads alternate repeatedly on the upper surface of the bottom panel.

11. The channeling system of claim 8, wherein the chevron-shaped treads define channels between the treads for confining a liquid.

12. The channeling system of claim 8, wherein the floor tray further comprises a leak resistant retention opening projecting upwardly from the upper surface to receive an anchor hook arranged on the foot well.

13. A floor tray for a vehicle comprising:
    a bottom panel having upturned sides forming a basin to contain a liquid;
    the bottom panel having a top surface that faces upwardly when the floor tray is disposed in a vehicle;
    a plurality of upstanding spaced apart non-linear treads on the top surface of the bottom panel;
    the treads being arrayed in rows with the treads of at least some rows being oriented in a direction different from a direction of orientation of the treads of adjacent rows; and
    the treads of at least some rows being shifted in the direction of the row by a predetermined distance with respect to the treads of adjacent rows.

14. The floor tray of claim 13 and wherein the different direction is an opposite direction.

15. The floor tray of claim 13, wherein the floor tray conforms to a rear passenger foot well.

16. The floor tray of claim 13, wherein the non-linear treads are chevron-shaped treads.

17. The floor tray of claim 16, wherein the predetermined distance is substantially equal to one half of a tread length plus one half of the spacing between treads of a row.

18. The floor tray of claim 13, further comprising a leak resistant retention opening projecting upwardly from the bottom panel to receive an anchor hook arranged on the foot well.

19. The floor tray of claim 18, wherein the leak resistant retention opening has a recessed land to receive an anchor hook extending from a foot well.

20. The floor tray of claim 13, wherein the floor tray is formed to accommodate an accelerator pedal.

* * * * *